United States Patent
Karpe et al.

(10) Patent No.: US 11,138,007 B1
(45) Date of Patent: Oct. 5, 2021

(54) PSEUDO CODING PLATFORM

(71) Applicant: Mocha Technologies Inc., Claymont, DE (US)

(72) Inventors: Sujit Karpe, Pune (IN); Nilesh Pethani, Pune (IN); Amit Mishra, Pune (IN); Wolfgang Holtgen, Laatzen (DE)

(73) Assignee: MOCHA TECHNOLOGIES INC., Claymont, DE (US)

( * ) Notice: Subject to any disclaimer, the term of this patent is extended or adjusted under 35 U.S.C. 154(b) by 0 days.

(21) Appl. No.: 17/123,555

(22) Filed: Dec. 16, 2020

(51) Int. Cl.
| | |
|---|---|
| G06Q 10/10 | (2012.01) |
| G06F 16/951 | (2019.01) |
| G06F 8/33 | (2018.01) |
| G06F 8/77 | (2018.01) |
| G06Q 50/20 | (2012.01) |

(Continued)

(52) U.S. Cl.
CPC ....... *G06F 8/77* (2013.01); *G06Q 10/063112* (2013.01); *G06Q 50/205* (2013.01); *G06F 8/20* (2013.01); *G06F 16/3325* (2019.01); *G06F 16/35* (2019.01); *G06F 16/951* (2019.01); *G06Q 10/0639* (2013.01); *G06Q 10/10* (2013.01); *G06Q 10/1053* (2013.01); *G06Q 50/10* (2013.01)

(58) Field of Classification Search
CPC ... G06F 8/77; G06F 8/20; G06F 16/35; G06F 16/951; G06F 16/906; G06F 16/3325; G06F 16/33; G06F 16/334; G06Q 10/063112; G06Q 10/1053; G06Q 10/06; G06Q 10/0639; G06Q 50/205; G06Q 50/10; G06Q 10/10; G06N 20/00
See application file for complete search history.

(56) References Cited

U.S. PATENT DOCUMENTS

| | | | | |
|---|---|---|---|---|
| 6,569,012 B2 * | 5/2003 | Lydon | .................... | G06Q 10/06 463/9 |
| 8,275,803 B2 * | 9/2012 | Brown | .................. | G06F 16/334 707/802 |

(Continued)

OTHER PUBLICATIONS

Jennifer Marlow et al., Activity traces and signals in software developer recruitment and hiring, Feb. 23, 2013, [Retrieved on Aug. 24, 2021], Retrieved from the internet: <URL: https://dl.acm.org/doi/pdf/10.1145/2441776.2441794> 11 Pages (145-156) (Year: 2013).*

*Primary Examiner* — Anibal Rivera
(74) *Attorney, Agent, or Firm* — Shumaker, Loop & Kendrick, LLP

(57) ABSTRACT

Disclosed is a method and a system for facilitating assessment on a pseudo coding platform. The method includes identifying a coding question and a program code answering the coding question. The method further includes identifying a logic in the program code. The method furthermore includes eliminating the logic from the program code to generate fillable blanks for a candidate to answer the coding question thereby creating a pseudo coding platform for assessment. Further, the method includes receiving an answer to the coding question from the candidate. The candidate enters the answer in the fillable blanks. Finally, the method includes assessing the answer using keyword matching techniques. It may be noted that the assessment includes at least an exact match assessment, a partial match assessment, and a keyword match assessment.

14 Claims, 2 Drawing Sheets

(51) Int. Cl.
*G06Q 10/06* (2012.01)
*G06F 8/20* (2018.01)
*G06F 16/332* (2019.01)
*G06F 16/35* (2019.01)
*G06Q 50/10* (2012.01)

(56) References Cited

U.S. PATENT DOCUMENTS

| | | | | |
|---|---|---|---|---|
| 8,819,007 | B2* | 8/2014 | Brown | F16H 3/54 707/731 |
| 9,940,394 | B1* | 4/2018 | Grant | H04L 51/08 |
| 10,229,205 | B1* | 3/2019 | Grant | G06F 16/951 |
| 10,796,217 | B2* | 10/2020 | Wu | G06Q 10/1053 |
| 2004/0210466 | A1* | 10/2004 | Hasebe | G06Q 10/10 434/219 |
| 2006/0229896 | A1* | 10/2006 | Rosen | G06Q 10/1053 705/321 |
| 2006/0229902 | A1* | 10/2006 | McGovern | G06Q 50/10 705/321 |
| 2007/0172809 | A1* | 7/2007 | Gupta | G09B 7/00 434/350 |
| 2007/0281771 | A1* | 12/2007 | Lydon | G06Q 10/06398 463/9 |
| 2009/0187446 | A1* | 7/2009 | Dewar | G06Q 10/0639 706/45 |
| 2014/0272842 | A1* | 9/2014 | Kwiatkowski | G09B 7/00 434/236 |
| 2016/0364692 | A1* | 12/2016 | Bhaskaran | G06Q 10/1053 |
| 2017/0052761 | A1* | 2/2017 | Gunshor | G06Q 10/1053 |
| 2017/0098178 | A1* | 4/2017 | Amor | G06F 8/20 |
| 2018/0089627 | A1* | 3/2018 | Liss | G06F 16/951 |
| 2018/0150739 | A1* | 5/2018 | Wu | G06N 3/006 |
| 2019/0019160 | A1* | 1/2019 | Champaneria | G06F 40/30 |
| 2019/0114593 | A1* | 4/2019 | Champaneria | G06F 16/3325 |
| 2019/0147407 | A1* | 5/2019 | Chamala | G06Q 10/1053 705/321 |
| 2019/0362645 | A1* | 11/2019 | Miller | G06N 5/041 |
| 2020/0097261 | A1* | 3/2020 | Smith | G06N 3/0454 |
| 2020/0311145 | A1* | 10/2020 | Li | G06F 16/90344 |
| 2020/0327503 | A1* | 10/2020 | Mendes | G06F 16/3334 |
| 2020/0327504 | A1* | 10/2020 | Eidelwein | G06N 20/00 |
| 2020/0327505 | A1* | 10/2020 | Gomes | G06N 20/00 |
| 2021/0026903 | A1* | 1/2021 | Grant | H04L 51/22 |

* cited by examiner

PSEUDO CODING PLATFORM

PRIORITY INFORMATION

The present application does not claim a priority from any other application.

TECHNICAL FIELD

The present subject matter described herein, in general, relates to a pseudo coding platform.

BACKGROUND

In recent times, the use of online assessment platforms has increased immensely. Almost all the companies are conducting an online assessment test for talent acquisition (recruitment), talent management (learning and development), and a certification program. The online assessment test generally comprises a Language Test, a Coding Test, and an Aptitude Test. The Coding Test is lengthy because a candidate has to write a code from the scratch. Further, the candidate does not have the freedom to select the programming language of his choice. Currently, many online assessment platforms are conducting coding tests for candidates. It has been observed that there is still a need for an improved system for assessing a candidate's programming skill.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for facilitating assessment on a pseudo coding platform. This summary is not intended to identify essential features of the claimed subject matter nor is it intended for use in determining or limiting the scope of the claimed subject matter.

In one embodiment, a method for facilitating assessment on a pseudo coding platform is disclosed. Initially, a coding question and a program code answering the coding question may be received. Further, a logic may be identified in the program code. Subsequently, the logic may be eliminated from the program code to generate fillable blanks for a candidate to answer the coding question thereby creating a pseudo coding platform for assessment. Further, an answer to the coding question may be received from the candidate. It may be noted that the candidate may enter the answer in the fillable blanks. Finally, the answer may be assessed using keyword matching techniques. It may be noted that the assessment comprises at least an exact match assessment, a partial match assessment, and a keyword match assessment. In one aspect, the aforementioned method for facilitating assessment on a pseudo coding platform may be performed by a processor using programmed instructions stored in a memory.

In another embodiment, a non-transitory computer-readable medium embodying a program executable in a computing device for facilitating assessment on a pseudo coding platform is disclosed. The program may comprise a program code for receiving a coding question and a program code answering the coding question. Further, the program may comprise a program code for identifying a logic in the program code. Subsequently, the program may comprise a program code for eliminating the logic from the program code to generate fillable blanks for a candidate to answer the coding question thereby creating a pseudo coding platform for assessment. Further, the program may comprise a program code for receiving an answer to the coding question from the candidate. It may be noted that the candidate enters the answer in the fillable blanks. Finally, the program may comprise a program code for assessing the answer using keyword matching techniques. The assessment comprises at least an exact match assessment, a partial match assessment, and a keyword match assessment.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for facilitating assessment on a pseudo coding platform disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
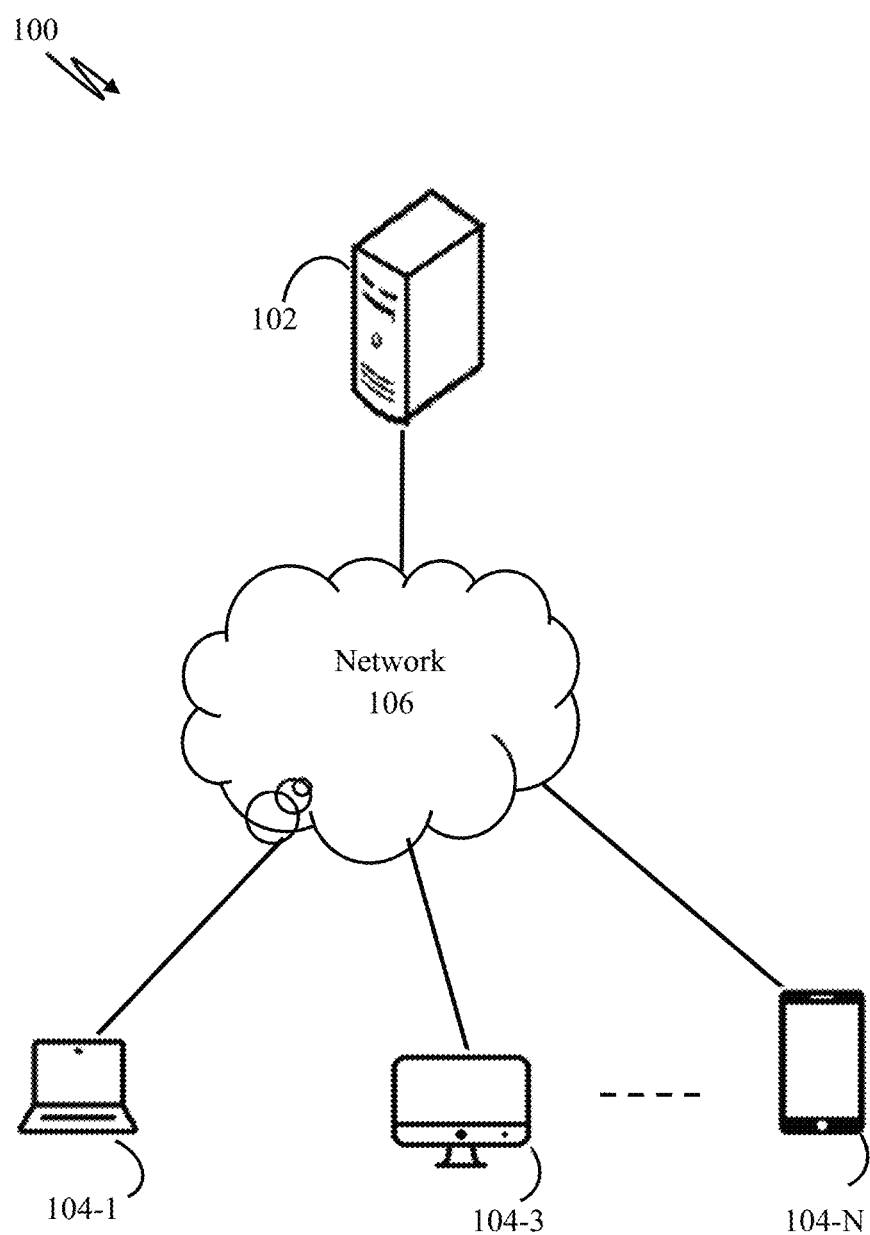
FIG. 1 illustrates a network implementation for facilitating assessment on a pseudo coding platform, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "identifying," "eliminating," "receiving," "assessing," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for facilitating assessment on a pseudo coding platform. It may be noted that the invention is related to an online assessment platform. Generally, when a coding assessment is conducted through an online platform a candidate is provided with a coding question and the candidate has to write a program code answering the coding question from a scratch. Further, the coding assessment is language restricted, meaning the candidate cannot choose any language to write the code. In order to overcome this limitation, the pseudo coding platform provides a coding question and a pseudo code with fillable blanks. It may be noted that the candidate is required to enter the answer in the fillable blanks. It is to be noted that the goal is to assess the candidate's approach for answering the coding question and not the syntax of the language. After receiving the answer from the candidate, the system assesses the answer without using any complier. It may be noted that the assessment may comprise at least an exact match assessment, a partial match assessment, and a keyword match assessment. While aspects of described system and method for facilitating assessment on a pseudo coding platform executed on a software may be implemented in any number of different computing systems, environments, and/or configurations, the embodiments are described in the context of the following exemplary system.

Referring now to FIG. 1, a network implementation 100 of a system 102 for facilitating assessment on a pseudo coding platform is disclosed. Initially, the system 102 receives a coding question and a program code answering the coding question. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives a coding question and a program code answering the coding question from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for facilitating assessment on a pseudo coding platform. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for facilitating assessment on a pseudo coding platform. The system 102 may receive a coding question and a program code answering the coding question. It may be noted that the coding question and the program code may be provided by at least one of a user, an examiner, or an online assessment platform. The program code may also be referred to as a predefined answer. In an example, the examiner may also provide keywords related to the program code. Further, the coding question and the program code may be stored in the memory.

Further to receiving, the system 102 may identify a logic in the program code. The logic may be identified automatically in real time using a set of AI based algorithms. The logic may be functions, loops, data structures, predefined libraries, and other programming constructs. In an embodiment, the logic may also be identified by at least one of a user, an examiner, or an online assessment platform.

Further to identifying, the system 102 may eliminate the logic from the program code to generate fillable blanks for a candidate to answer the coding question, thereby creating a pseudo coding platform. It may be noted that the fillable blanks are obtained without any human intervention. In an example, the fillable blanks may also be created by a user. Further, the pseudo coding platform may be displayed to a candidate.

Consider an example, the system receives a coding question and a program code answering the coding question. The coding question may be "Write a code for addition of two integers". Further, the program code answering the coding question may be as below:

include <stdio.h>
int main( )
{int number1, number2, sum;
printf("Enter two integers:");
scanf("% d % d", &number1, &number2);
sum=number1+number2;
printf("% d+% d=% d", number1, number2, sum);
return 0;}

Furthermore, the system may automatically eliminate the logic from the program code to generate fillable blanks for a candidate to answer the coding question. The program code after eliminating the logic may be shown as below:

include <stdio.h>
int main( )
{int number1, number2, sum;
_____
_____
_____
_____
return 0;}

Further to eliminating the logic, the system 102 may receive an answer to the coding question from the candidate. It may be noted that the candidate enters the answer in the fillable blanks. In an example, the candidate is provided a text box to enter the answer. It is to be noted that the candidate may write an answer to the coding question in any programming language and proprietary language such as SAP-ABAP, Salesforce-APEX, UiPath. Further, the answer provided by the candidate may not be compiled.

Further to receiving the answer, the system may assess the answer using keyword matching techniques. The keyword matching techniques may comprise but not limited to a Rapid Automatic Keyword Extraction (RAKE) algorithm, a Bidirectional Encoder Representations from Transformers (BERT), a FastText, a Support Vector Machines (SVM), a Conditional Random Fields (CRF), and a Term Frequency-Inverse Document Frequency (TF-IDF) algorithm. In one embodiment, the keywords may be extracted using a combination of two or more aforementioned algorithms. In an embodiment the answer may be assessed using Machine Learning, Natural Language Processing, and Deep Learning Techniques. It may be noted that the assessment comprises at least an exact match assessment, a partial match assessment, and a keyword match assessment. When the answer and the predefined answer exactly match with each other, the assessment is the exact match assessment. When the answer and the predefined answer partially matches with each other, the assessment is the partial match assessment. The keyword match assessment is performed when the answer and keywords associated with the predefined answer match with each other. Further, a score may be assigned to the answer based on the assessment. In an example, a maximum score may be assigned when the answer exactly matches with the predefined answer set. In another example, the score may be assigned to the answer when the keywords present in the answer matches with the keywords present in the predefined answer set.

Referring to the above example, the answer received from the candidate may be as shown below:

include <stdio.h>
int main( )
{int number1, number2, sum;
printf("Enter number1 and number2")
scanf("% d % d", &number1, &number2)
sum=number1+number2
printf("% d", sum)
return 0;}

It may be noted that the answer entered by the candidate is not an exact match when compared with the predefined answer. Also, the answer entered by the candidate does not include ";" after every statement. Hence, the program code cannot be compiled. Although the answer entered by the candidate is not completely accurate but the approach of the candidate to write the answer is correct. Therefore, the system 102 may assign a score to the candidate based on the partial assessment.

Figure 2:
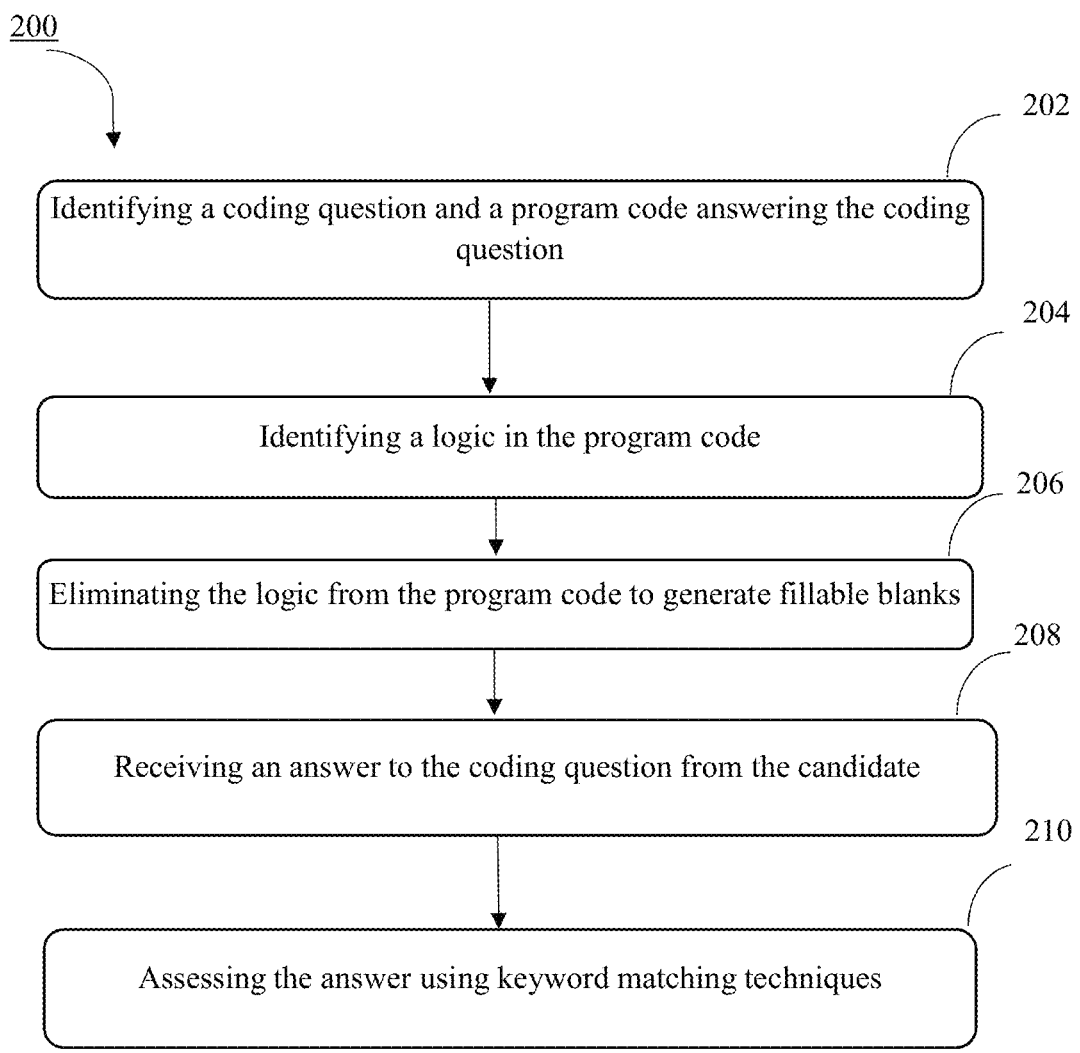
FIG. 2 illustrates a method for facilitating assessment on a pseudo coding platform, in accordance with an embodiment of the present subject matter.

Referring now to FIG. 2, a method 200 for facilitating assessment on a pseudo coding platform is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for facilitating assessment on a pseudo coding platform. Additionally, individual blocks may be deleted from the method 200 without departing from the scope of the subject matter described herein. Furthermore, the method 200 for facilitating assessment on a pseudo coding platform can be implemented in any suitable hardware, software, firmware, or combination thereof. However, for ease of explanation, in the embodiments described below the method 200 may be considered to be implemented in the above-described system 102.

At block 202, a coding question and a program code answering the coding question may be received. The coding question and the program code may be stored in the memory 112.

At block 204, a logic may be identified in the program code. The logic may be identified automatically in real time using algorithms.

At block 206, the logic may be eliminated from the program code to generate Tillable blanks for a candidate to answer the coding question thereby creating a pseudo coding platform for assessment. In one aspect, the logic may be stored in the memory 112.

At block 208, an answer to the coding question may be received from the candidate. It may be noted that the candidate enters the answer in the fillable blanks. In one aspect, the answer may be stored in the memory 112.

At block 210, the answer may be assessed using keyword matching techniques. It may be noted that the assessment comprises at least an exact match assessment, a partial match assessment, and a keyword match assessment.

Exemplary embodiments discussed above may provide certain advantages. Though not required to practice aspects of the disclosure, these advantages may include those provided by the following features.

Some embodiments of the system and the method enables to assess a program code in any language without use of a complier.

Some embodiments of the system and the method cut down dependency on compilers and an Integrated Development Environment (IDE).

Some embodiments of the system and the method enables accurate assessment calibration.

Some embodiments of the system and the method enables partial scoring for assessment.

Some embodiments of the system and method enables the examiner to assess the answers efficiently.

Some embodiments of the system and method uses Machine Learning, Natural Language Processing, and Deep Learning Techniques for assessing an answer in real-time.

Although implementations for methods and system for facilitating assessment on a pseudo coding platform have been described in language specific to structural features and/or methods, it is to be understood that the appended claims are not necessarily limited to the specific features or methods described. Rather, the specific features and methods are disclosed as examples of implementations for facilitating assessment on a pseudo coding platform.

The invention claimed is:

1. A method for facilitating assessment on a pseudo coding platform, the method comprises:
   receiving, by a processor, a coding question and a program code answering the coding question;
   identifying, by the processor, a logic in the program code automatically in real time using Artificial Intelligence based algorithms, wherein the logic comprises functions, loops, data structures, predefined libraries, and other programming constructs;
   eliminating, by the processor, the logic from the program code to generate fillable blanks for a candidate to answer the coding question thereby creating a pseudo coding platform;
   receiving, by the processor, an answer to the coding question from the candidate, wherein the candidate enters the answer in the fillable blanks; and
   assessing, by the processor, the answer using keyword matching techniques, wherein the assessment comprises at least an exact match assessment, a partial match assessment, and a keyword match assessment.

2. The method as claimed in claim 1, displaying the pseudo coding platform to a candidate.

3. The method as claimed in claim 1, wherein a score is assigned to the answer based on the assessment.

4. The method as claimed in claim 3, wherein a maximum score is assigned when the answer exactly matches with a predefined answer.

5. The method as claimed in claim 3, wherein the score is assigned to the answer when the keywords present in the answer matches with the keywords present in the predefined answer set.

6. The method as claimed in claim 1, wherein the fillable blanks are obtained without any human intervention.

7. The method as claimed in claim 1, wherein the keyword matching techniques comprises a Rapid Automatic Keyword Extraction (RAKE) algorithm, a Bidirectional Encoder Representations from Transformers (BERT), a FastText, a Support Vector Machines (SVM), a Conditional Random Fields (CRF), and a Term Frequency-Inverse Document Frequency (TF-IDF) algorithm.

8. The method as claimed in claim 1, wherein the answer is assessed without compiling the answer.

9. A system for facilitating assessment on a pseudo coding platform, the system comprising:
   a memory; and
   a processor coupled to the memory, wherein the processor is configured for:
   identifying a coding question and a program code answering the coding question;
   identifying a logic in the program code automatically in real time using Artificial Intelligence based algorithms, wherein the logic comprises functions, loops, data structures, predefined libraries, and other programming constructs;
   eliminating the logic from the program code to generate fillable blanks for a candidate to answer the coding question thereby creating a pseudo coding;
   receiving an answer to the coding question from the candidate, wherein the candidate enters the answer in the fillable blanks; and
   assessing the answer using keyword matching techniques, wherein the assessment comprises at least an exact match assessment, a partial match assessment, and a keyword match assessment.

10. The system as claimed in claim 9, displaying the pseudo coding platform to a candidate.

11. The system as claimed in claim 9, wherein a score is assigned to the answer based on the assessment.

12. The system as claimed in claim 11, wherein maximum score is assigned when the answer exactly matches with a predefined answer set.

13. The system as claimed in claim 11, wherein the score is assigned to the answer when the keywords present in the answer matches with the keywords present in the predefined answer set.

14. The system as claimed in claim 9, wherein the fillable blanks are obtained without any human intervention.

* * * * *